March 14, 1961  S. A. JONES  2,974,518
METHOD AND APPARATUS OF CALIBRATING A BELT CONVEYER SCALE
Filed Oct. 18, 1957  4 Sheets-Sheet 1

INVENTOR.
SAM A. JONES
BY Harry B. Keck
ATTORNEY

March 14, 1961  S. A. JONES  2,974,518
METHOD AND APPARATUS OF CALIBRATING A BELT CONVEYER SCALE
Filed Oct. 18, 1957  4 Sheets-Sheet 2

INVENTOR.
SAM A. JONES
BY
*Harry B. Keck*
ATTORNEY

INVENTOR.
SAM A. JONES
BY Harry B. Keck
ATTORNEY

Patented Mar. 14, 1961

2,974,518

METHOD AND APPARATUS OF CALIBRATING A BELT CONVEYER SCALE

Sam A. Jones, Pittsburgh, Pa., assignor to Consolidation Coal Company, a corporation of Pennsylvania Filed Oct. 18, 1957, Ser. No. 691,024

7 Claims. (Cl. 73—1)

The present invention relates to a method and apparatus for calibrating a belt conveyer scale and, more particularly, to a method and apparatus for intermittently calibrating a belt conveyer vertical displacement type weighing device.

Belt conveyers are commonly used for transporting various materials ranging from grain to minerals. Depending on the circumstances, it is often desirable to know the weight of material being delivered by the conveyor at a particular time, the bulk density of the material being delivered, or the total amount of material so transported over a period of time.

Accordingly, scales have been developed which provide these measurements. Generally a belt conveyer scale has a means for measuring the vertical displacement of a section of the belt due to the weight of material being carried upon it, and a means for measuring the linear velocity of the belt. Moreover, such scales usually have a means for integrating and recording such displacement and belt speed measurements. Most conveyer belt scales in commercial use continually provide an instantaneous load reading and an accumulated total weight reading.

Conveyer belt scales may be employed to maintain a specific predetermined bulk density of the material conveyed as in a coke oven installation, for example, where the automatic addition of oil or water at the loading point will raise or lower the bulk density of the coke oven feed passing over the conveyer belt. They may be employed to deliver a predetermined weight of material per unit of time by appropriately regulating the belt speed or the loading of the belt. The totalizing feature of the integrating and recording meter frequently provides a cost accounting record for an industrial process.

The two necessary measurements may be secured in any number of ways. For example, the vertical movement of the belt due to the material supported upon it may be measured mechanically by means of a scale beam positioned beneath the load carrying run of the belt and so mounted as to contact the underside of the belt. The pivotal movement of the beam in a vertical plane is a function of the weight of the material on the unsupported section of the belt above the scale beam. Some conveyer belt scales employ an electrical load cell in contact with the underside of the belt. The load cell contains a set of resistance wires bonded to a metal element which carries the weight of the belt section immediately above it. As the element is subjected to loading, the resistance of the wires changes in proportion to the weight on the belt.

The belt speed, on the other hand, may be measured by mechanically counting the revolutions per unit time of a wheel or roller of known diameter which contacts the belt and rotates in response to the tangential movement of the belt across it. Some scales measure the belt speed by means of an electrical tachometer which is driven by the belt and produces a voltage proportional to the belt speed.

The two measured values are transmitted to an integrating and recording meter by mechanical or electrical means whereupon they are integrated and recorded to provide readings of both instantaneous flow and the total weight delivered.

In some commercially available scales, a single electrical impulse line transmits to a recording meter a voltage which is a function of both the vertical deflection due to the weight of material and a function of the belt movement. Thus, the two measurements are automatically integrated prior to transmission to the totalizing meter.

A belt conveyer scale should be checked and recalibrated frequently to assure accuracy. A slight change in belt tension due to movement of a belt pulley or a belt roller, or due to variations in temperature, will introduce errors. Inaccuracies will result from changes in belt thickness due to wear or to an accumulation of sticky materials on the underside of the belt, as well as from lack of lubrication or mechanical failure in the scale itself.

Despite the apparent desirability of making frequent intermittent checks on the calibration of such devices, particularly where a totalizing scale is used for cost accounting purposes, such is not the common practice. Current methods of calibration comprise manually attaching known weights to the vertical displacement measuring means and then operating the unloaded belt. The accuracy of the resulting meter reading can be readily determined by comparing it with the reading which should occur when the particular known weight is employed. The inconvenience associated with such calculations, and the prolonged shutdown in transportation operations which accompany such manual operations, lead to relatively infrequent checks.

It is a principal object of this invention to provide a method and apparatus for quickly and conveniently checking and calibrating belt conveyor weighing devices.

The apparatus of the present invention comprises a pivotally mounted frame depending from a supporting structure above the conveyer belt, a rotatable wheel affixed to the frame, a tachometer operationally attached to the rotatable wheel, a first weight mounted on the frame (the first weight is necessary only if the frame itself is not sufficiently heavy), a means for raising and lowering the frame such that the rotatable wheel can be suspended above the conveyer belt or rested directly upon it, a second weight which can be raised or lowered by appropriate means so that it may be suspended above or brought to bear upon the frame, and remote control means for operating the various components of the apparatus. The apparatus is positioned above the conveyer belt such that the wheel, when lowered, will contact the belt at a point directly above the scale mechanism which contacts the underside of the belt.

To operate the apparatus, the frame is lowered so that the rotatable wheel contacts the unloaded belt. The weight of the frame, the rotatable wheel, the tachometer and the first weight are predetermined such that an effective force corresponding to about 25 percent of the maximum belt load is brought to bear upon the belt. The second weight is chosen such that when lowered upon the elongated frame, a total effective force equivalent to about 75 percent of the maximum belt load is brought to bear upon the belt. When the belt is operated without load, the conveyor belt scale will, of course, measure and record the weight applied by the calibration apparatus as if it were the weight of some material being conveyed past the point of measurement at that time.

The reading on the totalizing meter of the calibration apparatus results from the continuous integration of the value of the known weight with the belt speed value as measured by the tachometer of the calibration device. The belt speed value is a function of the number of rotations of the rotatable wheel of known diameter. On the other hand, the reading on the totalizing meter of the conveyor belt scale results from the continuous integration of the weight value determined by the vertical displacement measuring device, with the belt speed determined by the tachometer or similar device of the scale.

After a given test run, the readings of the totalizing meter should correspond to that indicated by the known weight and belt speed. Any variance can be corrected according to the proper adjustment means provided for the particular conveyer scale. Test runs may be made with various known weights to determine the weightometer's accuracy for unloaded to maximum load values, but for most purposes two loading conditions should suffice, e.g., about 25 and about 75 percent load.

Where only the instantaneous load is being measured, and the belt travel is immaterial, the belt scale can be checked or calibrated as follows: The belt is operated with a known weight contacting the upper surface of the load carrying run, and the weightometer meter reading is compared with the known weight. It should, of course, indicate the quantity of the known weight and any variation therefrom can be corrected by means appropriate to the particular instrument. Any number of loading conditions can be checked by choosing various weights ranging from zero (unloaded) to maximum load.

To illustrate the present invention, I have chosen to describe the use of my apparatus in conjunction with the more complex belt conveyer totalizing scale.

Figure 4:
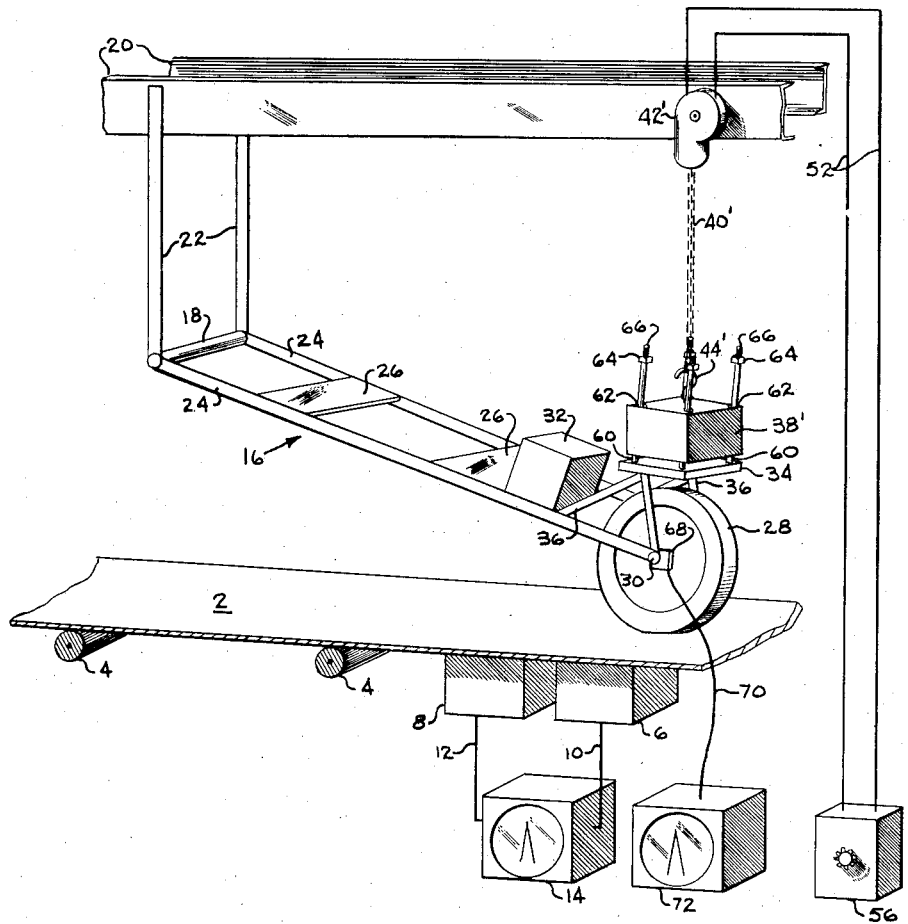
Figure 5:
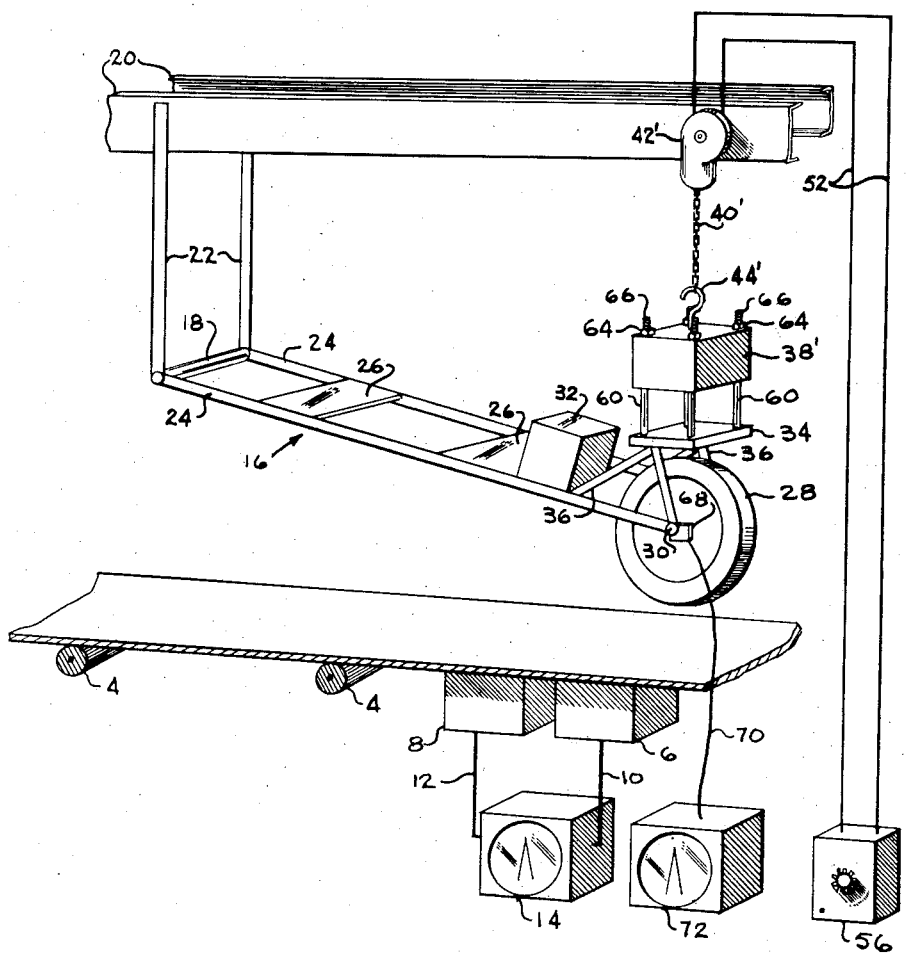

Figure 4 is an illustration of the present invention wherein a single motivating means is employed and the apparatus is positioned such that the unloaded conveyer belt is subjected to an intermediate loading condition; and Figure 5 is an illustration of the present invention wherein a single motivating means is employed and the apparatus is suspended above and out of contact with the conveyer belt.

Throughout the drawings, corresponding numerals are employed to designate corresponding elements.

Figure 1:
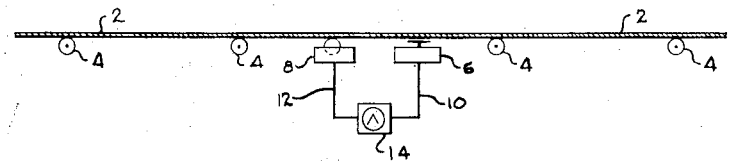
Figure 1 is a schematic illustration in side elevation of a conveyer belt and a conveyer belt scale associated therewith.

The type of scale illustrated in Figure 1 is by no means universally employed. It is, however, sufficiently representative of conveyer belt scales generally, to permit a full explanation of the construction, operation and utility of the present invention. For purposes of description, I show a simple arrangement wherein the vertical deflection reading and the belt travel reading are transmitted by separate impulse lines to a conventional integrating and recording meter.

Figure 1 shows a conveyer belt 2 in cross-section supported upon belt rollers 4. Beneath the conveyer belt 2 is a means for weighing the material so transported comprising a device 6 for measuring the vertical displacement of the conveyer belt 2, a device 8 for measuring the linear velocity of the conveyer belt 2, connecting impulse lines 10 and 12 and an integrating and recording meter 14.

The vertical displacement of an unsupported section of a conveyer belt from its unloaded position, and consequently the instantaneous load of the belt, is a function of the weight of the material resting upon such section at any given moment. This displacement may be measured by employing a scale beam or a load cell beneath the load carrying run of the belt. The device 6 comprises such a beam, load cell or equivalent mechanism.

The total weight of material delivered by the conveyer belt 2 during a period of time is a function of the linear velocity of the belt during that period. This velocity is measured by a mechanical tachometer which counts the revolutions per minute of time of a wheel of known circumference rotating in response to tangential contact with the moving belt, or by means of an electrical tachometer which is driven by the belt and produces a voltage proportional to the belt speed. The device 8 comprises such a mechanism or an equivalent thereof.

The values measured by the device 6 and the device 8 are transmitted by appropriate pneumatic, hydraulic, mechanical or electrical connecting impulse lines 10 and 12 respectively, to the integrating and recording meter 14. Here the values are continuously integrated and recorded to provide readings of both the instantaneous and cumulative load carried by the belt 2.

In order to make the initial calibration or subsequently to check the calibration of such a conveyer belt scale, known weights are applied in one manner or another to the vertical displacement measuring device. The present apparatus provides a new and improved means for accomplishing this purpose.

Figure 2:
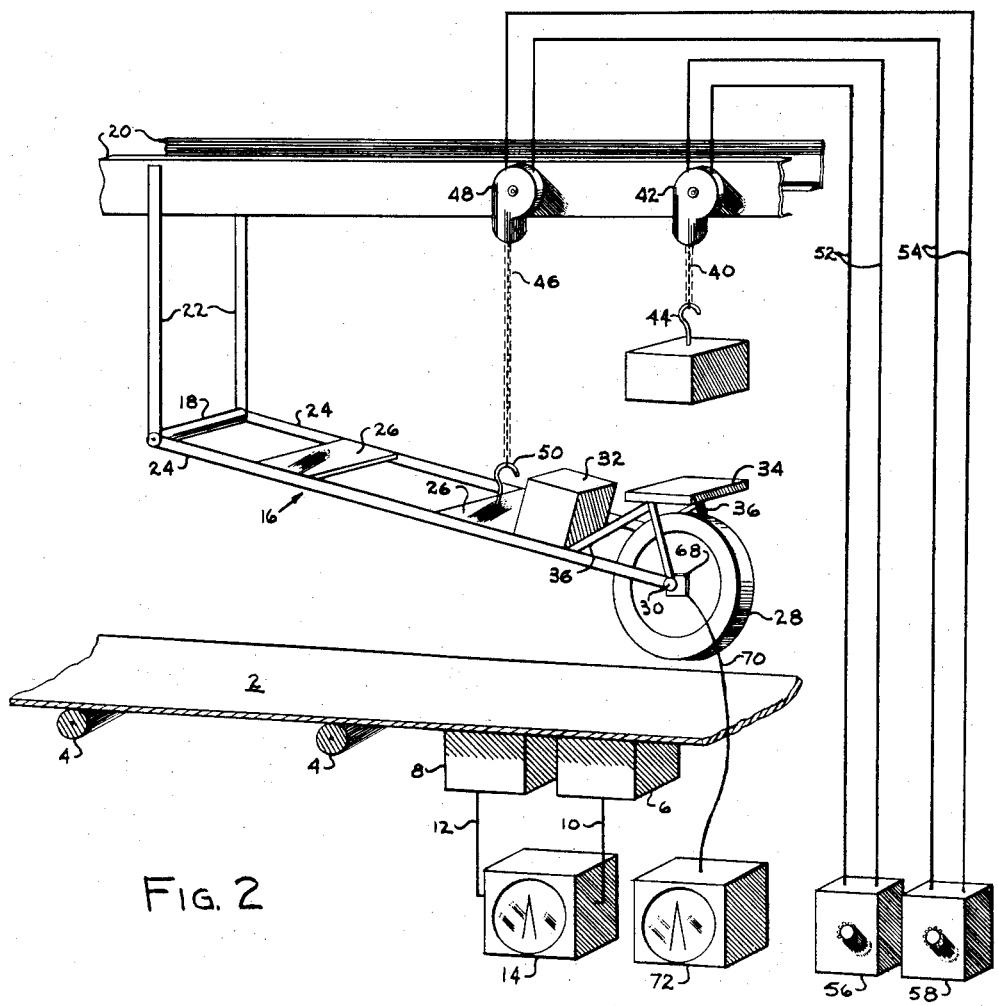
Figure 2 is an illustration of the present invention wherein two motivating means are employed.

The present invention as viewed in Figure 2 comprises an elongated frame 16 pivotally mounted at one end upon a fixed horizontal axle 18. The horizontal axle 18 is attached to a supporting structure 20 by means of shackles 22.

The elongated frame 16 has two longitudinal members 24 and transverse members 26. A freely rotatable wheel 28 (or other freely rotatable cylinder) is mounted upon an axle 30 which is transversely positioned between the longitudinal members 24 of the elongated frame 16 at the end opposite the horizontal axle 18.

A first weight 32 is mounted atop the elongated frame 16. The position and quantity of the first weight 32 are chosen such that the total vertical force applied to the empty conveyer belt 2 when the elongated frame 16 is allowed to pivot downwardly to contact the conveyer belt 2 is the equivalent of the vertical force applied to the conveyer belt 2 at that point when it is carrying about 25 percent of its maximum load. The vertical force actually exerted upon the belt by the apparatus is its "effective weight."

A platform 34 is mounted atop support members 36 which extend upwardly from the longitudinal members 24. The platform 34 is adapted to receive a second weight 38 which is suspended above the platform 34 by means of a chain 40 which extends downwardly from a chain hoist 42. The second weight 38 is attached to the chain 40 by means of a hook 44.

A second chain 46 extends downwardly from a second chain hoist 48 and is attached to a transverse member 26 of the elongated frame 16 by means of a second hook 50. Both chain hoist 42 and second chain hoist 48 are mounted on the supporting structure 20, and they are connected by electrical conductors 52 and 54 respectively to hoist controls 56 and 58 respectively.

If the second chain hoist 48 is operated so as to pay out a sufficient length of the chain 46, the elongated frame 16 will pivot downwardly about the axle 18 such that the rotatable wheel 28 rests upon the conveyor belt 2 at a point directly above the contact point of the device 6 which measures the vertical displacement of the belt 2. If the chain 46 is hanging slack, the vertical force exerted upon the unloaded conveyer belt 2 by the apparatus, is equal to about 25 percent of the maximum belt load. This, of course, is accomplished by properly choosing the weights of the apparatus components and the moment arm through which they move to produce the desired "effective weight."

By operating the chain hoist 42, the chain 40 may be payed out and the second weight 38 permitted to rest upon the platform 34. The quantity of the second weight 38 is chosen such that when added to the unsupported elongated frame 16 (i.e., chain 40 and second chain 46 are both slack) the total force applied to the unloaded conveyer belt 2 is equivalent to about 75 percent of the maximum belt load.

The entire apparatus may be suspended above and out of contact with the conveyer belt 2 during the regular periods of belt operation. This is accomplished by causing the chain hoists 42 and 48 to take up the chains 40 and 46 respectively.

Figure 3:
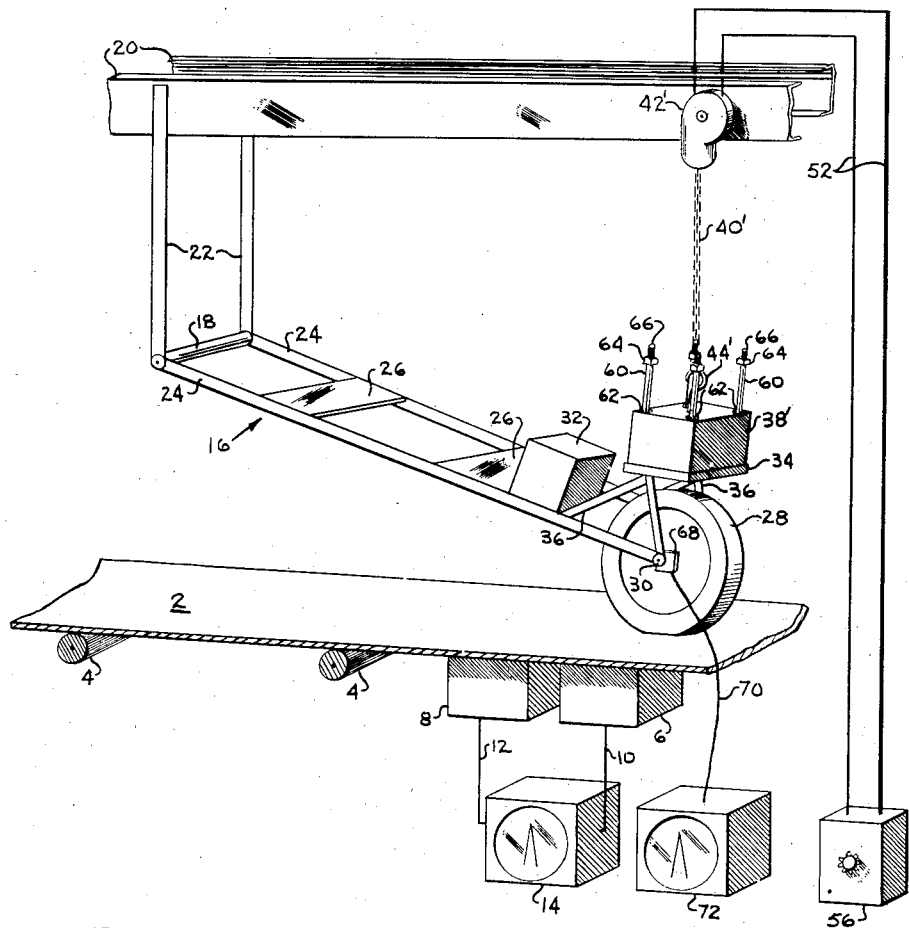
Figure 3 is an illustration of the present invention wherein a single motivating means is employed and the apparatus is positioned such that the unloaded conveyer belt is subjected to the maximum loading condition attainable with the present invention.

Figures 3, 4 and 5 illustrate the operation of an alternative embodiment of the present invention when only one motivating means (e.g., a single chain hoist) is employed. The instrumentation of the present invention is discussed in regard to these particular figures, although it is equally applicable to Figure 2.

The embodiment shown in Figures 3, 4 and 5 varies but little from that shown in Figure 2. It has, however, no parts corresponding to the second chain hoist 48, the second chain 46, the second hook 50, electrical conductors 54 or hoist controls 58 of Figure 2. Controlled movement of the elongated frame 16 is made possible by a direct, but slideable connection between the platform 34 and the second weight 38'.

The quantity of the second weight 38' is chosen such that when it is rested on the platform 34 the total force applied to the empty conveyer belt 2 is the equivalent of the vertical force exerted upon that point when the conveyer belt 2 is carrying about 75 percent of its maximum load (Figure 3).

The spindles 60 which are secured to platform 34 are sufficiently long that they protrude from the top of the holes 62 even when the second weight 38' is raised above and out of contact with the platform 34 (Figure 4). Nuts 64 having a diameter greater than that of the holes 62 are affixed upon the threaded end portion 66 of each spindle 60.

An electric chain hoist 42' is mounted on the supporting structure 20 above the platform 34. A chain 40' extends downwardly from the chain hoist 42 and is attached to the second weight 38' by means of a hook 44' extending upwardly from the top of the second weight 38'.

The chain hoist 42' is operated from a hoist control 56 to which it is connected by electrical conductors 52. When the chain 40' is in a slack position (Figure 3) the second weight 38' rests upon the platform member 34. The unsupported elongated frame 16 is pivoted downwardly about the horizontal axle 18 such that the rotatable wheel 28 rests upon the conveyer belt 2 at a point directly above the contact point of the device 6 which measures the vertical displacement of the belt. The vertical force exerted upon the unloaded conveyer belt 2 when the apparatus is in this position is equal to about 75 percent of the maximum conveyer belt load. This, of course, is accomplished by properly choosing the weights of the apparatus components and the moment arm through which they move to produce the desired effective weight.

When the chain hoist 42' is operated so as to draw up the chain 40', the second weight 38' is lifted from the platform 34. By halting the chain hoist 42' at a position where the second weight 38' has not been raised sufficiently to contact the nuts 64 atop the spindles 60, the apparatus may be maintained in the manner shown in Figure 4. With the second weight 38' suspended above and out of contact with the platform 34, a vertical force equivalent to only about 25 percent of the maximum belt load is exerted on the conveyer belt 2.

If the chain hoist 42' is again operated to take in an additional length of the chain 40', the upperside of the second weight 38' will contact the nuts 64 and the entire calibration apparatus will be pivoted upward about the horizontal axle 18. When suspended in this position (Figure 5) the calibration apparatus does not interfere with the regular operation of the conveyer belt 2.

A tachometer 68 is mounted on the frame 16 to record the rotational rate of the wheel 28. Corresponding impulses are transmitted through a connecting line 70 to a recording meter 72 which is manually adjusted to correspond to the effective weight imposed upon the belt 2 by the calibration apparatus. The integrated product of the adjusted effective weight and the rotations of the wheel 28 is recorded on the meter 72 as the actual "effective load" and is compared with the indicated load of the integrating and recording meter 14. When a variance occurs, appropriate adjustments are made in the meter 14 until its reading compares to that of the meter 72.

The original calibration or correction of a prior calibration, if divergent readings show such to be necessary, are then made in the conventional manner for the particular scale being employed. This operation is, of course, independent of the present invention, since each scale manufacturer provides some adjustment means.

Thus, it should be apparent that the conveyer belt scale can be quickly and conveniently calibrated by one man. Where the calibration or correction of the particular scale is made by an adjustment on the scale meter itself, the operator need not even approach the conveyer belt to make such a calibration or correction.

In the event that more than two loading conditions must be checked to insure accuracy of a particular scale, additional weights may be readily employed. Although not specifically illustrated, the addition of such successive weights and their operation should be apparent from the foregoing discussion of Figures 3, 4 and 5. By mounting an additional set of spindles atop the second weight, a third weight may be positioned thereon and nuts attached to the threads of such spindles. Thus, when the chain is slack, the force of both the second and third weights will bear upon the platform member. When the chain is taken up slightly by the chain hoist, the third weight can be suspended above the second weight. When an additional length of chain is taken in, the upper side of the third weight will abut against the spindle nuts and the second weight will be lifted clear of the platform. The frame itself will be pivotally raised by further shortening of the chain.

An alternative construction would be to employ a plurality of individually controlled weights in the manner illustrated in Figure 2. The duplication of apparatus inherent in such a system, however, would make it less attractive economically than the one described above.

The elongated frame 16 need not be aligned with the longitudinal axis of the conveyer belt 2 as has been illustrated. Such alignment does provide the advantage of compactness, however. Moreover, as shown, the stresses placed on the apparatus are borne by the entire bearing surface of the supporting axle since the motion of the belt is perpendicular to said axle.

A cable and cable winch could be substituted for the chain and chain hoist, or a chain, cable or other connecting means could be utilized in conjunction with an air or hydraulic cylinder. The use of such alternatives adds flexibility to the present invention without departing from its basic principles.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A device for intermittent calibration of a weighing scale for a moving conveyer belt comprising a freely rotatable cylinder positioned above said conveyer belt and having a rotational axis transverse to the longitudinal axis of said conveyer belt, means to support said cylinder above said belt, a weight positioned above said freely rotatable cylinder, suspension means connecting said freely rotatable cylinder and said weight to an overhead support member, means for adjusting said suspension means whereby said freely rotatable cylinder may be brought to bear upon said conveyer belt at a point directly above said weighing scale, means for further adjusting said suspension means whereby said weight may be brought to bear upon said freely rotatable cylinder, means for measuring the rotational rate of said cylinder while in contact with said conveyer belt, integrating means for multiplying said rotational rate by the effective weight bearing upon said conveyer belt, and means for registering the integrated value for comparison with the corresponding registered value of said weighing scale.

2. A device for intermittent calibration of a weighing scale for a moving conveyer belt comprising a frame pivotally mounted upon a fixed horizontal axis above said belt, a freely rotatable cylinder mounted on said frame at a position removed from said fixed horizontal axis, said cylinder having a rotational axis transverse to the longitudinal axis of said conveyer belt, said cylinder and said frame forming a first weight, an additional weight positioned above said frame, suspension means connecting said frame and said additional weight to an overhead support member, means for adjusting said suspension means whereby said frame may be pivoted about said fixed horizontal axis and its predetermined effective weight brought to bear upon said conveyer belt at the point of contact with said cylinder to register on said weighing scale, means for further adjusting said suspension means whereby said additional weight may be lowered to contact said frame thus bringing its additional predetermined effective weight to bear upon said conveyer belt, means for measuring the rotational rate of said cylinder while in contact with said conveyer belt, integrating means for multiplying said rotational rate by the effective weight bearing upon said conveyer belt, and means for registering the integrated value for comparison with the corresponding registered value of said weighing scale.

3. A device for intermittent calibration of a weighing scale for a moving conveyer belt comprising a frame pivotally mounted upon a fixed horizontal axis above said belt, a freely rotatable cylinder mounted on said frame at a position removed from said fixed horizontal axis, said cylinder having a rotational axis transverse to the longitudinal axis of said conveyer belt, said cylinder and frame forming a first weight, suspension means connecting said frame to an overhead support member, means for adjusting the length of said suspension whereby said frame may be pivoted downward about said fixed horizontal axis and its predetermined effective weight brought to bear upon said conveyer belt at the point of contact with said cylinder to register on said weighing scale, a second weight independently suspended above said frame, means for lowering said second weight onto said frame whereby the additional predetermined effective weight of said second weight is brought to bear upon said conveyer belt, means for measuring the rotational rate of said cylinder while in contact with said conveyer belt, integrating means for multiplying said rotational rate by the effective weight bearing upon said conveyer belt, and means for registering the integrated value for comparison with the corresponding registered value of said weighing scale.

4. A device for intermittent calibration of a weighing scale for a moving conveyor belt comprising a frame pivotally mounted upon a fixed horizontal axis above said belt, a freely rotatable cylinder mounted on said frame at a position removed from said fixed horizontal axis, said cylinder having a rotational axis transverse to the longitudinal axis of said conveyer belt, said cylinder and said frame forming a first weight, an additional weight slideably attached to said frame, said additional weight being capable of limited independent slideable movement in a vertical plane, suspension means connecting said frame and said slideably attached additional weight to an overhead support member, said suspension means being affixed to said additional weight, means for adjusting the length of said suspension means whereby said frame may be pivoted downward about said fixed horizontal axis so that the predetermined effective weight of said first weight registers on said weighing scale, means for further adjusting the length of said suspension means whereby said additional weight may be slideably lowered to contact said frame thus bringing its additional predetermined effective weight to bear upon said conveyer belt, means for measuring the rotational rate of said cylinder while in contact with said conveyer belt, integrating means for multiplying said rotational rate by the effective weight bearing upon said conveyer belt, and means for registering the integrated value for comparison with the corresponding registered value of said weighing scale.

5. A device for intermittent calibration of a weighing scale for a moving conveyer belt comprising a frame pivotally mounted upon a fixed horizontal axis above said belt, a freely rotatable wheel mounted on said frame at the end opposite from said fixed horizontal axis, said wheel having a rotational axis transverse to the longitudinal axis of said conveyer belt, said frame and wheel forming a first weight, a first chain hoist mounted upon an overhead support member, a first chain operationally attached to and depending from said first chain hoist, said first chain being attached at its lower extremity to said frame, a second chain hoist mounted upon said overhead support member, a second chain operationally attached to and depending from said second chain hoist, an additional independent weight attached to and suspended from the lower extremity of said second chain, means for operating said first chain hoist to adjust the length of said first chain whereby said frame may be pivoted about said fixed horizontal axis and the predetermined effective weight of said first weight brought to bear upon the upper load carrying surface of said conveyer belt at the point of contact of said wheel and said conveyer belt, said point of contact being directly above the point where said weighing scale contacts the lower surface of said conveyer belt, means for measuring the rotational rate of said wheel while in contact with said conveyer belt, integrating means for multiplying said rotational rate by the effective weight bearing upon said conveyer belt, and means for registering the integrated value for comparison with the corresponding registered value of said weighing scale.

6. A device for intermittent calibration of a weighing scale for a moving conveyer belt comprising a frame pivotally mounted upon a fixed horizontal axis above said belt, a freely rotatable wheel mounted on said frame at the end opposite from said fixed horizontal axis, said wheel having a rotational axis transverse to the longitudinal axis of said conveyer belt, said wheel and said frame forming a first weight, an additional weight slideably attached to the upper side of said frame, said additional weight being capable of limited independent slideable movement in a vertical plane above said frame, a chain hoist mounted upon an overhead support member, a chain operationally attached to and depending from said chain hoist, said chain being attached at its lower extremity to said additional weight, means for operating said chain hoist to adjust the length of said chain whereby said frame may be pivoted about said fixed horizontal axis and the predetermined effective weight of said first weight brought to bear upon the upper load carrying surface of said conveyer belt at the point of contact of said wheel and said conveyer belt and whereby said slideably attached additional weight remains suspended above said frame, said point of contact being directly above the point where said weighing scale contacts the lower surface of said conveyer belt, means for operating said chain hoist to further adjust the length of said chain whereby said additional weight may be slideably lowered to rest upon said frame thus bringing its additional predetermined effective weight to bear indirectly upon said conveyer belt at the point of contact of said wheel and said conveyer belt, means for measuring the rotational rate of said wheel while in contact with said conveyer belt, integrating means for multiplying said rotational rate by the effective weight bearing upon said conveyer belt, and means for registering the integrated value for comparison with the corresponding registered value of said weighing scale.

7. A method for calibrating an instrument which measures both the velocity of a moving belt and the weight of material conveyed by said belt, said instrument including a weighing scale positioned beneath said belt, said method comprising the steps of freeing the belt of material, impressing a predetermined weight upon said belt directly above said weighing scale, measuring the velocity of said belt independently of said instrument, and correcting said instrument to provide a reading corresponding to said predetermined weight and said independently measured velocity of said belt.

References Cited in the file of this patent

UNITED STATES PATENTS

| | | |
|---|---|---|
| 1,054,168 | Boswell | Feb. 25, 1913 |
| 1,298,302 | Davis | Mar. 25, 1919 |
| 2,633,972 | Capstack et al. | Apr. 7, 1953 |